United States Patent [19]
Bennett

[11] Patent Number: 5,512,904
[45] Date of Patent: Apr. 30, 1996

[54] METHOD AND APPARATUS OF ESTABLISHING A VEHICLE AZIMUTH

[75] Inventor: Sidney M. Bennett, Chicago, Ill.

[73] Assignee: Andrew Corporation, Orland Park, Ill.

[21] Appl. No.: 259,028

[22] Filed: Jun. 13, 1994

[51] Int. Cl.⁶ .................................................. H04B 7/185
[52] U.S. Cl. ........................ 342/357; 364/449; 364/450; 364/453
[58] Field of Search .................................. 342/357, 457; 364/449, 450, 453, 457

[56] References Cited

U.S. PATENT DOCUMENTS

| | | | |
|---|---|---|---|
| 4,107,689 | 8/1978 | Jellinek | 343/112 |
| 4,139,889 | 2/1979 | Ingels | 364/460 |
| 4,673,878 | 6/1987 | Tsushima et al. | 324/226 |
| 4,796,191 | 1/1989 | Honey et al. | 364/450 |
| 4,814,989 | 3/1989 | Döbereiner et al. | 364/444 |
| 4,819,175 | 4/1989 | Wuttke | 364/449 |
| 4,847,769 | 7/1989 | Reeve | 364/424.02 |
| 4,989,151 | 1/1991 | Nuimura | 364/449 |
| 5,014,205 | 5/1991 | Sindlinger et al. | 364/449 |
| 5,023,798 | 6/1991 | Neukirchner et al. | 364/449 |
| 5,046,011 | 9/1991 | Kakihara et al. | 364/449 |
| 5,058,023 | 10/1991 | Kozikaro | 364/450 |
| 5,109,344 | 4/1992 | Kakihara et al. | 364/449 |
| 5,276,451 | 1/1994 | Odagawa | 342/357 |
| 5,278,424 | 1/1994 | Kagawa | 250/561 |
| 5,367,463 | 11/1994 | Tsuji | 364/449 |

FOREIGN PATENT DOCUMENTS

| | | |
|---|---|---|
| 103847 | 3/1984 | European Pat. Off. . |
| 0496538 | 1/1992 | European Pat. Off. . |
| 471405 | 2/1992 | European Pat. Off. . |
| 514887 | 11/1992 | European Pat. Off. . |
| 0567268 | 4/1993 | European Pat. Off. . |
| 3912108 | 10/1990 | Germany . |
| 4178587 | 6/1992 | Japan .................... 342/457 |
| 2014309 | 8/1979 | United Kingdom . |
| 9210824 | 6/1992 | WIPO . |

*Primary Examiner*—Thomas H. Tarcza
*Assistant Examiner*—Dao L. Phan
*Attorney, Agent, or Firm*—Arnold, White & Durkee

[57] ABSTRACT

The method and apparatus of establishing a vehicle azimuth provides for the automatic establishment of the vehicle azimuth for a vehicle positioning mechanism, and the continued improvement of accuracy, if desired. The method and apparatus accomplishes this by obtaining an assumed initial azimuth and an actual path azimuth as the vehicle passes in the vicinity of a first beacon. The actual path azimuth can be determined as between the first beacon and a subsequent beacon further along the route, or alternatively, the first beacon can be associated with a restricted, travel path or path segment having the actual path azimuth at the exit of the maintenance garage or ferry dock. The vehicle positioning system dead reckons its position from the vicinity of the first beacon and establishes an apparent path azimuth for the vehicle over the same path having the actual path azimuth. The difference between the actual path azimuth and the apparent path azimuth is the initial offset angle. The initial offset angle corrects the assumed initial vehicle azimuth to obtain the vehicle azimuth. As the vehicle traverses more distance between the adjacent beacons or alternatively along the restricted travel path or path segment, the accuracy of the initial offset angle improves because the dead reckoning calculation becomes more accurate. Furthermore, when the vehicle passes a subsequent beacon, any ambiguity with respect to the vehicle azimuth is corrected because the coordinates of the first and second beacons or, alternatively, of two GPS positions are known, and the actual path azimuth between the two beacons or positions can be used to offset the apparent path azimuth calculated solely by dead reckoning with the assumed initial vehicle azimuth.

12 Claims, 5 Drawing Sheets

METHOD AND APPARATUS OF ESTABLISHING A VEHICLE AZIMUTH

FIELD OF THE INVENTION

The invention relates to vehicle positioning or navigation systems that use a gyroscope to determine changes in direction of a vehicle. More particularly, the present invention relates to establishing the vehicle azimuth.

BACKGROUND OF THE INVENTION

A rate gyroscope can be used to determine the direction and magnitude of a turn performed by a land vehicle through the process of integrating the indicated rate from the initial position to the current time. In order to determine the actual vehicle azimuth angle (with respect to true North or other reference), the initial vehicle azimuth must be known. Ordinarily one can assume that the initial vehicle azimuth is the same as the final vehicle azimuth for the last trip. Exceptions are when the vehicle has been rotated on a turntable, is transported on a ferry or on another vehicle, battery power has been lost, or other event such as a repair has invalidated the assumption that the vehicle has remained stationary at the last known azimuth, or the azimuth information has been lost.

Absolute azimuth angle measurement instruments such as the magnetic compass have been used, but are subject to large and unpredictable errors associated with magnetic anomalies, bridges, tunnels, power lines, and other ferrous metal objects along the route. Gyro compasses are too expensive for many applications. Other aids to land navigation such as beacons and the global positioning system (GPS) do not intrinsicly provide information on the actual vehicle azimuth.

Some urban mass transit and some automobile navigation systems provide for vehicle navigation and reporting through the use of "signposts", which are typically radio or optical beacons installed at periodic intervals along the route. The position of the vehicle in transit between the signposts is obtained through dead reckoning (DR) navigation. This technique combines knowledge of the vehicle azimuth and distance travelled (typically obtained from the vehicle odometer) to compute the geographic position of the vehicle. Azimuth information is typically provided by a magnetic compass, and is subject to the anomalies described previously. These errors make it difficult to determine promptly whether the vehicle has left the desired route or to compute the vehicle location in these circumstances. A more accurate method of measuring the vehicle azimuth is the integrated output of a rate gyro, or the angle output of a rate integrating gyro, but the initial angle must be known. As mentioned previously, determining the initial vehicle azimuth is generally not a problem, but it must occasionally be re-established due to special circumstances, and a need exists for establishing an initial vehicle azimuth soon after the previous vehicle azimuth data is invalidated.

SUMMARY OF THE INVENTION

The primary objective of the present invention relates to the establishment of an initial vehicle azimuth for a vehicle location determination system by correcting an assumed initial azimuth with an initial offset angle determined between an actual path azimuth of a travel path associated with a first beacon or a sequence of beacons and an apparent path azimuth having the assumed initial azimuth and determined over the same path.

In accordance with an embodiment of the present invention, the vehicle location determination system uses a gyroscope to determine the change in the angle of direction for the vehicle. The present invention determines the actual path azimuth of a travel path as the vehicle passes in the vicinity of a first beacon. The actual path azimuth can be determined as between the first beacon and a subsequent beacon further along a straight route. Alternatively, the first beacon can be associated with a restricted travel path having the actual path azimuth, or the first beacon can be associated with a path segment having the actual path azimuth. As the vehicle passes the first beacon position, the present invention dead reckons the vehicles' position from the vicinity of the first beacon and establishes an apparent path azimuth with the assumed initial azimuth over the path having the actual path azimuth from the vicinity of the first beacon. The assumed initial azimuth is corrected by the initial offset angle between the apparent path azimuth and the actual path azimuth to obtain the vehicle azimuth. As the vehicle further traverses more distance along the path or path segment from the first beacon or alternatively along the restricted travel path associated with the first beacon, the accuracy of the initial offset angle improves because the dead reckoning calculation for the apparent path azimuth becomes more representative of the actual path azimuth except for the initial offset angle, thereby the accuracy of the initial offset angle improves. Furthermore, when the vehicle passes a second beacon, any ambiguity with respect to the initial offset angle is corrected because the coordinates of the first and second beacons or, alternatively, of two GPS positions are known, and the actual path azimuth between the two beacons or positions can be used to determine the initial offset angle to correct the apparent path azimuth calculated by dead reckoning with an assumed initial azimuth angle.

BRIEF DESCRIPTION OF THE DRAWINGS

Other aspects and advantages of the present invention may become apparent upon reading the following detailed and upon reference to the drawings in which.

Figure 1:
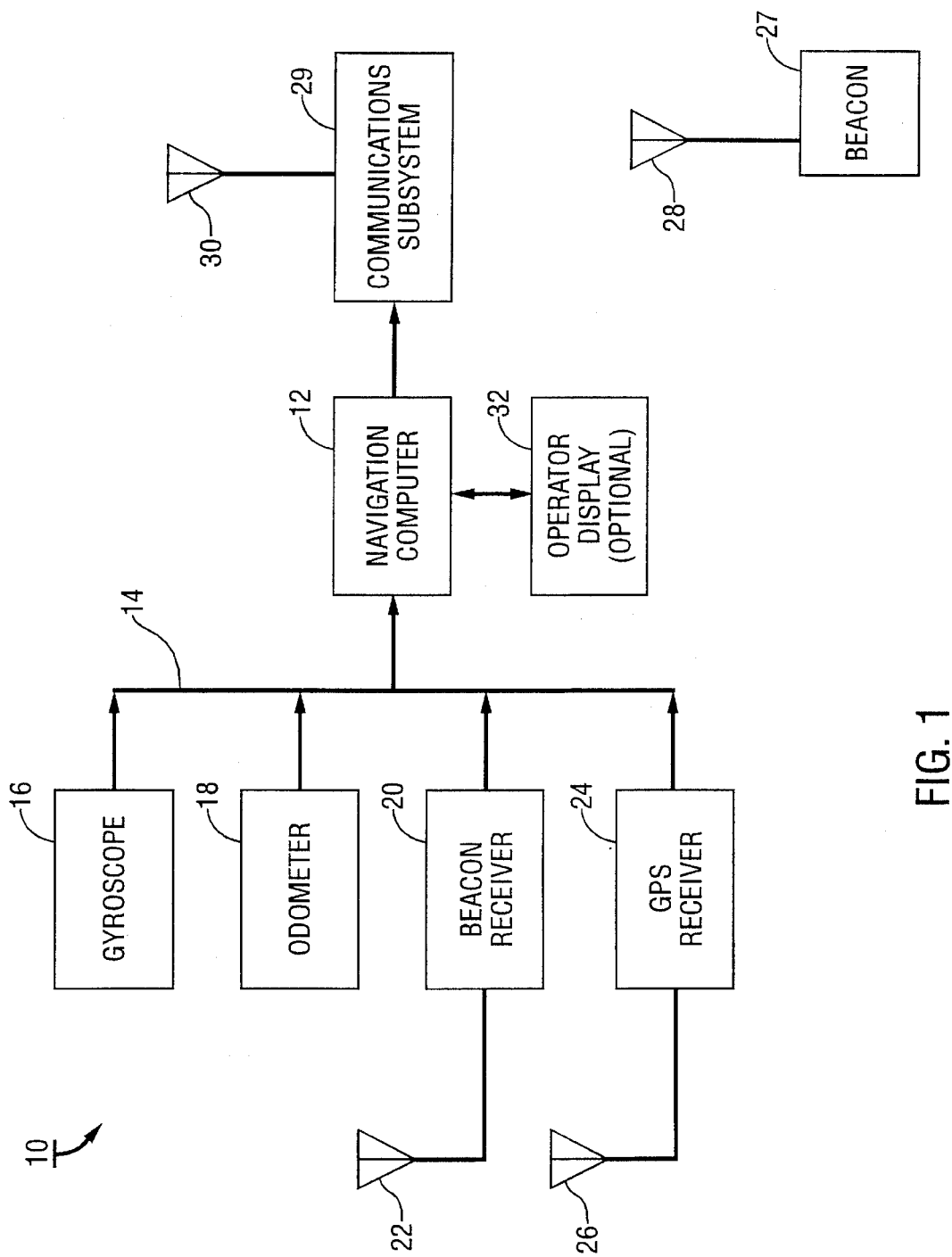
FIG. 1 is a block diagram of an exemplary vehicle location determination system arrangement which establishes the initial vehicle azimuth when used in accordance with the present invention.

While the invention is susceptible to various modifications and alterative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DETAILED DESCRIPTION OF THE PREFERRED EMBODIMENT

In accordance with a preferred embodiment of the present invention, an apparatus and method establishes a vehicle azimuth for a vehicle location determination system by correcting an assumed initial azimuth with an initial offset angle. The initial offset angle is determined between an actual path azimuth associated with a first beacon or sequence of beacons on a vehicle travel path and an apparent path azimuth determined over the same path but resulting from the assumed initial azimuth.

Referring now to the drawings and particularly to FIG. 1, a vehicle location determination system 10 that establishes the vehicle azimuth according to the present invention is shown. The location determination system 20 includes a navigation computer 12 with appropriate processing circuitry, memory and coupling circuitry 14. The coupling circuitry 14 links the computer 12 with a gyroscope 16, a distance sensor such as odometer 18 and, alternatively, a beacon receiver 20 with a corresponding beacon antenna 22 and/or a GPS receiver 24 with a corresponding GPS receiving antenna 26. The GPS receiver 24 can also receive and incorporate differential GPS correction signals and methods to increase the geographical location accuracy. A beacon 27 having a beacon transmitting antenna 28 is also shown. The computer 12 is also shown coupled to a communications subsystem 29 and a corresponding communications antenna 30. The communications subsystem 29 can send positioning information. For example, a bus can be equipped with the positioning system 10 and send position information back to the bus depot to ensure that the bus is on the proper route. Finally, the computer 12 is optionally coupled to a display 32.

Figure 2A:
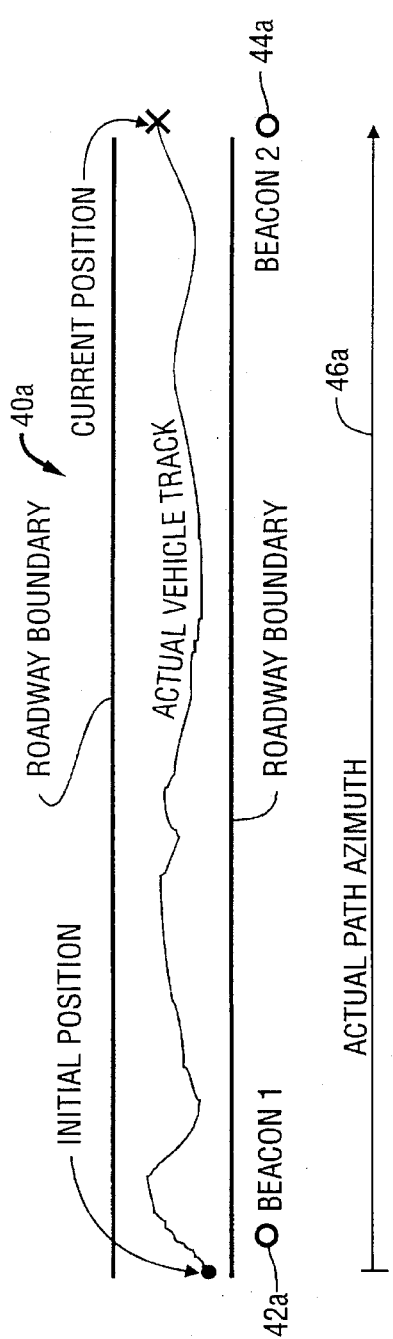
FIG. 2a–2c shows alternative travel paths which can be utilized by the present invention having actual path azimuths from the vicinity of a first beacon.

Referring to FIG. 2a, consider a situation where a vehicle traverses a route 40a between a first position or beacon 42a and a second position or beacon 44a. For simplicity, assuming that the route 40a is straight, an actual path azimuth 46a, or bearing (with respect to true North or other reference), is defined by the geographic position of the two beacons 42a and 44a and the sequence of encounter between the beacons. Without knowledge of the sequence of encounter between the beacons 42a and 44a, an ambiguity exists as to whether the vehicle is proceeding on the correct vehicle azimuth or its reciprocal bearing (180 degrees different). FIG. 2a shows that the vehicle encounters the beacon 42a first and then encounters the beacon 44a. Once the beacon 44a is encountered, the sequence of encounter is clarified, eliminating the ambiguity in the computation. Where the direction of travel is known, such as the exit of a depot, or due to a one-way street, the sequence of encounter is known and an actual path azimuth 46a can be supplied by or associated with the relevant beacon 42a, eliminating the initial 180 degree ambiguity.

Thus, proximity to the first beacon or position 42a indicates the particular street or path 40a that the vehicle is on and that the next beacon 44a is further down the street at the actual path azimuth 46a of the street. If the path is wide enough to enable changes in vehicle direction, however, the vehicle may not be aligned with the centerline of the street at the starting or ending point of the computation, and thus assuming that the initial instantaneous gyroscope angle or the ending instantaneous gyroscope angle coincided with the apparent path azimuth of the vehicle on the route 40a between the two adjacent beacons could lead to an erroneous apparent path azimuth. A bus pulling away from a stop or changing lanes are examples of relatively large, but transient, deviations in the vehicle azimuth as the vehicle traverses the path 40a.

Figure 2B:
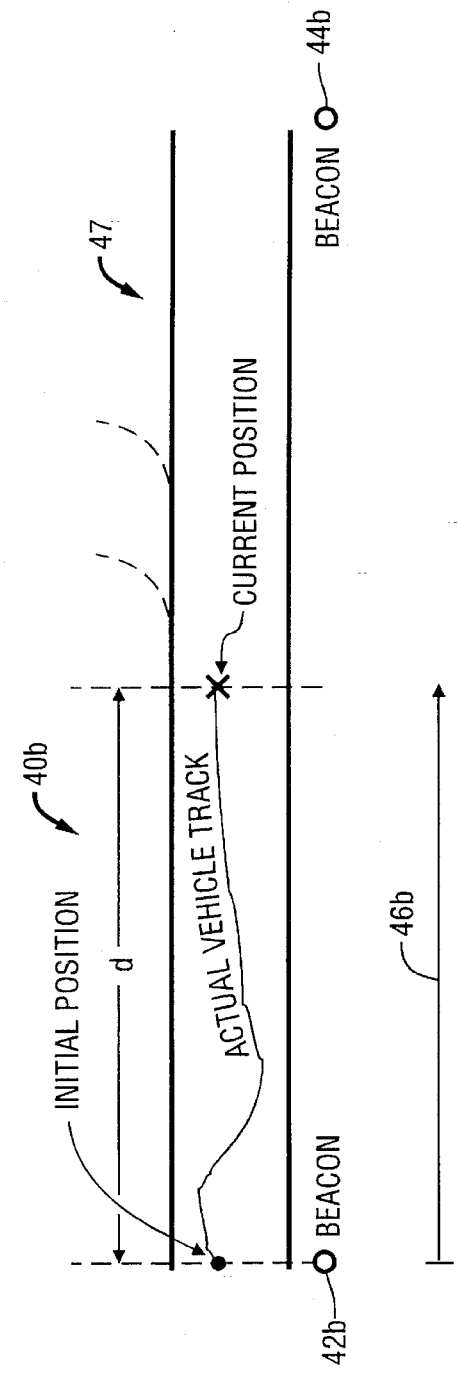
Figure 2C:
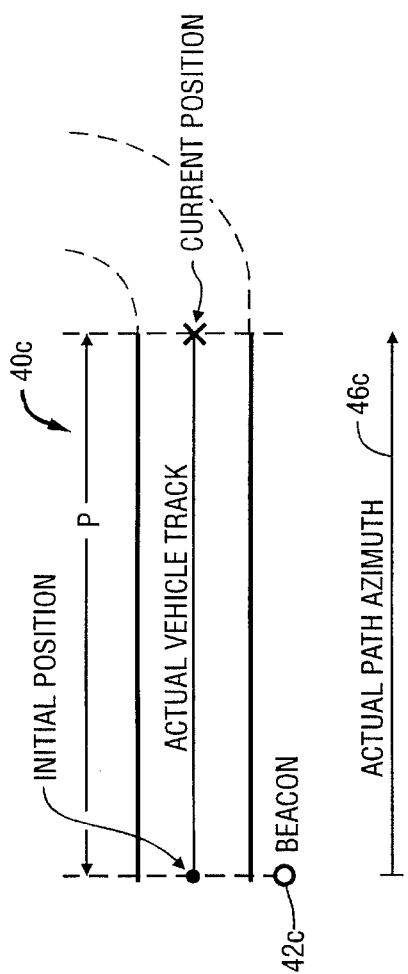

Alternatively, as shown in FIG. 2b, proximity to a first beacon 42b in the vicinity of a path segment 40b indicates that the vehicle is on the path segment 40b which has an actual path azimuth 46b. The path segment 40b can preferably be defined by a segment distance d. After the vehicle traverses the segment distance d, the calculation of an apparent path azimuth should be relatively accurate with respect to the actual path azimuth 46b for the path segment 40b except for the initial offset angle. Incidentally, the segment distance d of the path segment 40b can be as long as the distance of the route 47 between the beacons 42b and 44b or longer if desired. Similarly, as shown in FIG. 2c, proximity to a first beacon 42c in the vicinity of a restricted travel path 40c indicates that the vehicle is on the restricted travel path 40c having an actual path azimuth 46c. Preferably, the distance P of the restricted travel path associated with the first beacon 42c can also be determined to assist in the calculation of the vehicle azimuth. For example, after the distance of the restricted travel path or path segment is traversed, the apparent vehicle azimuth should be relatively accurate with respect to the actual path azimuth 46c (except for the initial offset angle) if a proper distance for the path is chosen, and the initial offset angle can be accurately determined as between the apparent path azimuth and the actual path azimuth of the path. The initial offset angle is used to correct the assumed initial vehicle azimuth to obtain an accurate initial vehicle azimuth. If the distance of the path segment 40b or the restricted travel path 40c is not known and lesser accuracy can be accepted on a temporary basis, the initial offset angle can be redetermined at frequent distance intervals commencing at the first beacon position, and the initial vehicle azimuth computation can terminate due to an off-route condition, utilizing the last initial offset angle as described below.

Depending on the specific embodiment, various forms of information can be stored in the vehicle or contained in the data transmitted to the vehicle, such as the geographical coordinates of the beacons or positions; the actual path azimuth of the path 40a between the beacons 42a and 44a, of the restricted travel path 40c associated with the beacon 42c or of the path segment 40b associated with the travel path 40b; the distance of the restricted travel path 40c; or the distance of the path segment 40b. This information can be precomputed and stored in a look-up table, or computed as necessary. Incidently, the terms beacon, signpost or position are used interchangeably, depending on the context, and can communicate with the vehicle by radio or optical means.

The present invention determines an accurate initial offset angle between the actual path azimuth of the path 40a, 40b or 40c (depending on the available information and specific embodiment) and an apparent path azimuth by accurately determining the apparent path azimuth with an assumed initial azimuth along the same path having the actual path azimuth. The initial offset angle is obtained as the difference between the apparent path azimuth and the actual path azimuth. The initial offset angle should also be the same as the difference between the assumed initial vehicle azimuth and the actual initial vehicle azimuth. Thus, an accurate vehicle azimuth is obtained by correcting the assumed initial vehicle azimuth with the initial offset angle determined as between the actual path azimuth and the apparent path azimuth. The accuracy of the initial offset angle thus determined between the apparent path azimuth calculation and the actual path azimuth improves by the length of the baseline or path having the actual path azimuth over which the apparent path azimuth is determined.

Figure 3:
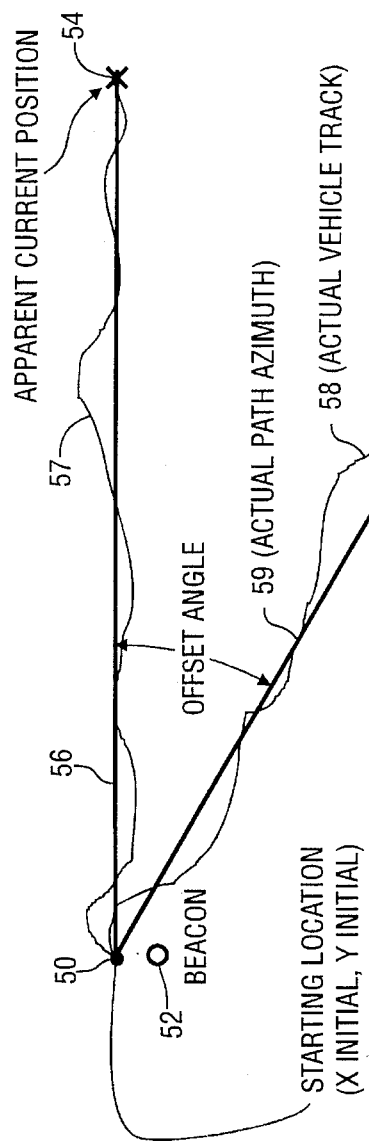
FIG. 3 shows the travel path of a vehicle from a starting location to a current position and the dead reckoning of the apparent path azimuth of vehicle travel which is offset from the initial vehicle azimuth by an initial offset angle.

Referring to FIG. 3, the preferred embodiment of the present invention determines the apparent path azimuth through a dead reckoning calculation. The dead reckoning (DR) calculation can be performed from any initial point 50 near a first beacon 52 to obtain a current DR position 54 of the vehicle for determining the apparent path azimuth 56 of the apparent vehicle track 57. Depending on the accuracy of the calculation, the apparent vehicle track 57 should coincide with an actual vehicle track 58, and similarly, the apparent path azimuth 56 should coincide with the actual path azimuth 59 except for the initial offset angle. For purposes of clarity, assume that the actual position of the vehicle at the initial point 50 is known (methods such as the use of the beacons can be used to establish this approximate position). In practice, there is some uncertainty as to exactly when the vehicle passes in the vicinity of the first beacon.

The position of the vehicle is typically computed at equally spaced time intervals, with the change in the X and Y Cartesian coordinates of local position (taken to represent positive directions in the East and North directions, respectively) being given by:

delta X=(delta D)×sin (theta)

delta Y=(delta D)×cos (theta)

theta=theta initial+sum (delta theta)−initial offset angle where theta is the vehicle azimuth (defined as clock-wise with respect to North and known except for the initial offset angle), delta D is the distance that the vehicle has travelled since the last position estimate, which is usually obtained from the odometer 28 (FIG. 1), sum (delta theta) is the integrated output of a rate gyroscope from the time of the initial position computation and theta initial is the assumed initial vehicle azimuth angle. In modem vehicles, the odometer 28 obtains data through a sensor on the vehicle transmission. This discussion is presented utilizing a Cartesian coordinate system for simplicity, and since the distance is usually short, errors due to the earth's spheroidal shape are minimal. Spherical coordinates can be used if the distances are such that position errors are significant in the context of the particular application.

The coordinates for the DR determined position 54 are obtained by summing the increments delta X and delta Y from the initial position:

X=Xinitial+sum (delta X)

Y=Yinitial+sum (delta Y)

where Xinitial and Yinitial are the initial position coordinates.

We can define the apparent path azimuth 56 of the current DR position 54 with respect to the initial position 50 by:

apparent path azimuth=arctan{(X−Xinitial)/(Y−Yinitial)}.

Since the property of the tangent function is to go to infinity at ±Pi/4, it is easiest to use the formula given above for indicated angles within 45 degrees of 0 and 180 degree azimuths, and the function:

apparent path azimuth=90−arctan {(Y−Yinitial)/(X−Xinitial)) else-where.

The method of determining the vehicle azimuth begins to compute the vehicle DR position 54 from any arbitrary point 50 near the first beacon or position 52. In order to compute an initial offset angle between the apparent path azimuth and the actual path azimuth 58, the present invention determines the actual path azimuth 58 associated with the travel path 40*a* (FIG. 2*a*) between beacons, with the segment path 40*b* (FIG. 2*b*) or with the restricted travel path 40*c* (FIG. 2*c*) and computes the apparent path azimuth 56 having an assumed initial azimuth with respect to the initial point 50 as the vehicle moves to the current DR position 54. The offset between the apparent path azimuth and that which is known to be the actual path azimuth of the path between the adjacent beacons, of the path segment associated with the first beacon or of the restricted travel path associated with the first beacon is the initial offset angle. It can be seen that the initial offset angle can be obtained relatively rapidly, and the value continually improved for the entire path after the first position or beacon as the apparent path azimuth is more accurately determined.

As previously mentioned, the accuracy of the process is improved by the length of the baseline over which the apparent path azimuth is determined. Moreover, the apparent path azimuth can be calculated after certain distances or intervals and used to obtain the initial offset angle, or the apparent path azimuth can be continuously calculated and continuously used to obtain a corrected initial offset angle.

Alternatively, the present invention encompasses calculating the initial offset angle with respect to a path segment 40*b* (FIG. 1 ) and updating the initial offset angle upon the vehicle passing in the proximity of a second beacon or position. Furthermore, the initial offset angle can be recalculated with a subsequent beacon or sequence of beacons or positions. The results of subsequent initial offset angle computations can be combined using conventional filtering techniques. Various types of estimation filters such as Kalman, can be used to optimally combine the subsequent estimates of the initial offset angle. This process can be generalized to situations where there is a turn between two beacons, but the computational process may need some additional information on the position and nature of the turn if the computation is to be accomplished prior to encountering the second beacon.

The vehicle azimuth, theta, is determined by applying the initial offset angle as an adjustment to the assumed initial azimuth angle and cumulative changes in vehicle azimuth along the path. Going back to the initial position 50, the sum (delta theta) or the cumulative changes in vehicle azimuth are zero, and theta becomes the actual initial vehicle azimuth.

If the width of the roadway is given by W, and the distance traveled along the roadway is D, then the possible error in azimuth with respect to the actual path azimuth is given by:

errorbound=arctan (W/2D)

Figure 4:
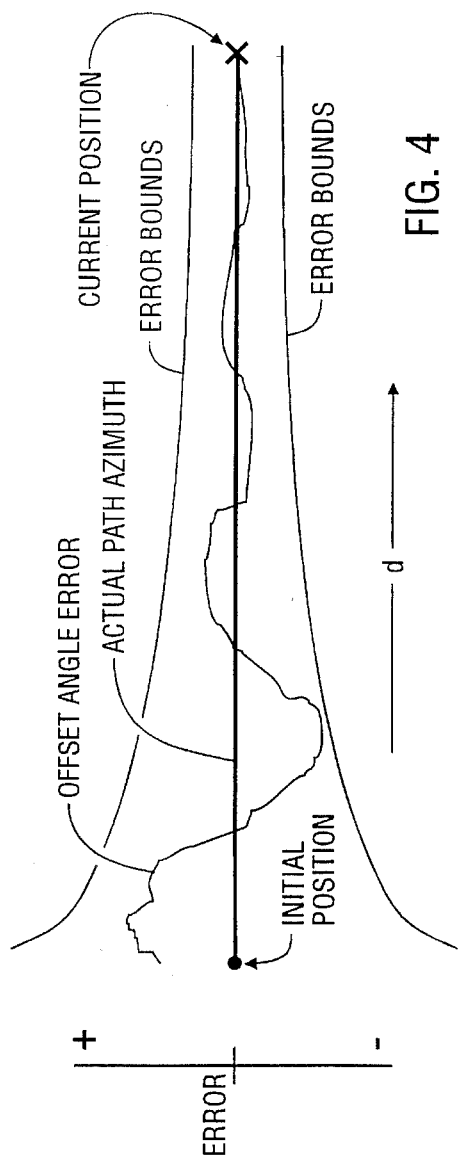
FIG. 4 shows how the initial offset angle error decreases as the distance traveled increases.

This suggests that the initial offset angle can be computed after only a short distance of travel with a known upper bound on the error. As such, the presence of two relatively closely spaced beacons or a beacon associated with a relatively short path or path segment near the exit of a maintenance depot or ferry dock can be desirable to ensure rapid determination of an approximate initial offset angle to correct the assumed initial vehicle azimuth. In any event, the initial offset calculation can be inaccurate because the vehicle can be anywhere within the roadway, but the vehicle azimuth computation becomes more and more accurate as the distance travelled along the path increases as shown in FIG. 4. Because the initial transverse position of the vehicle within the roadway can be unknown, the actual error bound is twice that computed above. In the case of a two way street, the width can be assumed to behalf the actual roadway width.

The initial vehicle azimuth can be relatively accurate if the initial beacon or beacons are positioned at a selected exit route or restricted path from the maintenance garage or ferry dock. Even though the early determination of the initial vehicle azimuth is less accurate than will be obtained with greater distance traveled, it can be valuable if the vehicle departs from the planned route. The vehicle is determined to have left the planned route if the corrected DR position deviates from the linear path by some predetermined multiple of the roadway width. Thus an off-route condition can be almost immediately determined. The off-route condition can also be utilized to interrupt the vehicle azimuth determination if the distances of the path segment d or the restricted travel path p is not known. Once an off-route condition is encountered, the initial offset angle estimation is terminated, and the last initial offset estimate is used. Continuing to estimate the initial vehicle azimuth under these circumstances is inappropriate as the assumption that the vehicle is travelling a specified route having the actual path azimuth is violated. In such circumstances, it may be appropriate from the system to communicate this fact either to a central location or to the vehicle operator. A roadway width W has been assumed in the discussion, but it is evident that a separate width W can be associated with each beacon pair to more closely approximate the actual roadway width. The DR position of the vehicle will at least be known to some degree of accuracy, and if street maps are available, the ambiguity can be usually identified through map matching techniques, unless the street pattern is entirely regular.

The procedure has been described in terms of beacons or signposts, but it is also evident that GPS signals can be used for the purpose of position determination, whether received continuously or sporadically. It is preferable to use DGPS data in order to achieve the desired accuracy in the shortest time period. The use of sporadically received GPS signals as the equivalent of beacons or a sequence of positions is particularly useful in urban areas where the satellite signals are blocked by buildings. If GPS signals are used as the equivalent of beacons, the actual path azimuth is preferably determined by the coordinates of a pair of positions or a sequence of positions, and the apparent path azimuth is calculated from the first position.

Gyro errors should also be considered in determining the accuracy of the determination of the initial alignment. They generally consist of bias offset, bias drift, and scale factor errors.

It is well known that when the vehicle is stationary, it cannot be turning. Thus the bias offset can be eliminated by a measurement of the gyro rate output when the vehicle is stationary, at the beginning of the journey, and at those intervals, as determined by the odometer when the vehicle is stationary during the journey, such as at a traffic light or bus stop. The continuous readjustment of the bias error reduces the effect of bias drifts. Between the adjustments, the bias drift will integrate to result in azimuth angle error. Proper design of the rate gyro will minimize this error. Scale factor error results when the indicated rotation rate differs from the actual physical input rate by a multiplicative constant. With a 1 percent scale factor error, a turn through 90 degrees will be measured as either 89 or 91 degrees. This can be a severe problem if the vehicle continues to turn in the same direction. In the current circumstance, where the vehicle is constrained to move down a street which is straight between the beacons, the total turning angle is usually significantly less than 90 degrees, else the vehicle will leave the street in a short distance of travel. The net turning angle error due to scale factor is small. Hence, scale factor error is not usually a problem in this situation. Where the path between beacons involves a turn, some error may be introduced by scale tactor error.

Figure 5:
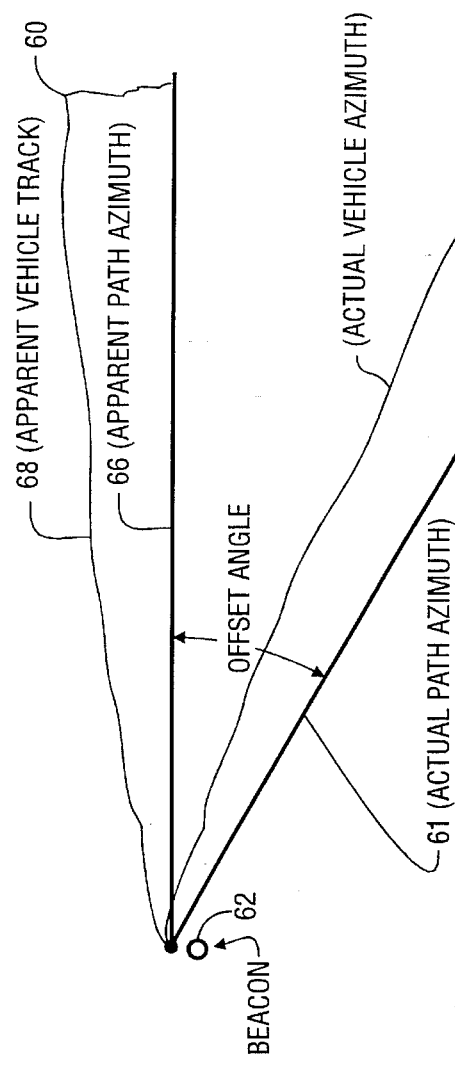
FIG. 5 shows the unambiguous calculation of the initial vehicle azimuth for a vehicle travelling between two beacons obtained by offsetting the apparent path azimuth with the initial offset angle between the actual path azimuth between the beacons and the apparent path azimuth.
Figure 6:
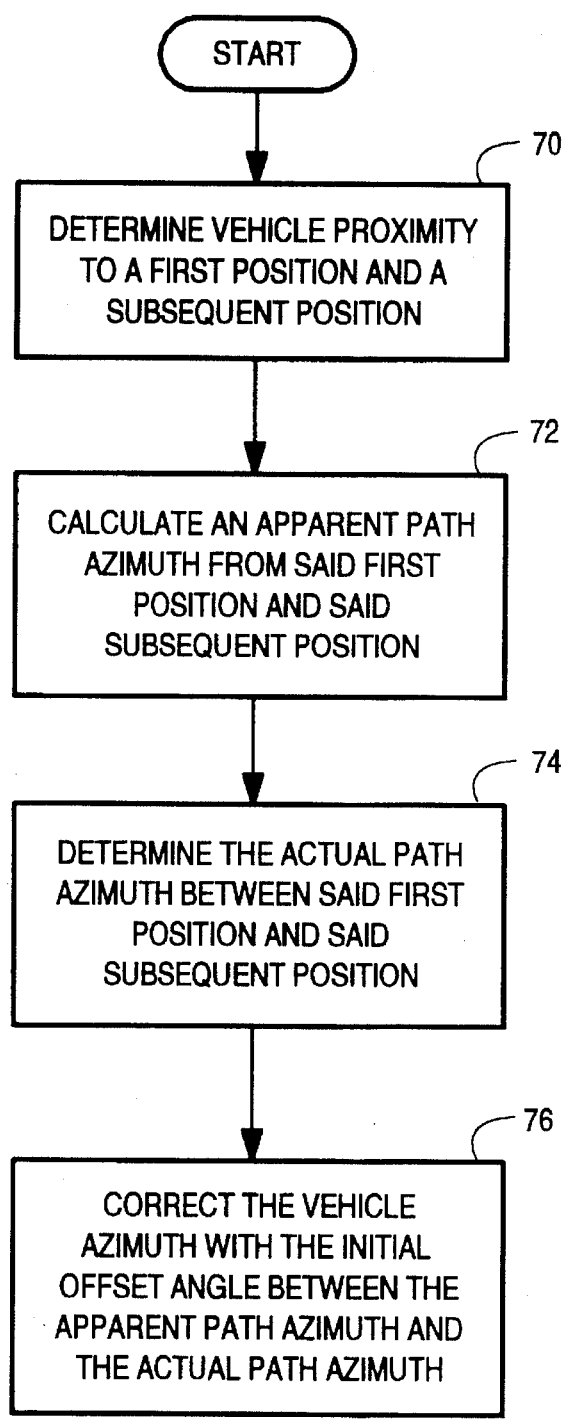
FIG. 6 shows a flowchart in accordance with the principles of the present invention.

When the route has a turn 60 between the beacons or positions, and the vehicle has no detailed information about the position of the turn 60, then the computation can still be completed if the apparent path azimuth is determined over a path segment having an actual path azimuth and preferably having a known distance. If this is not possible, an accurate determination of the initial offset angle is made when the vehicle passes the subsequent beacon. At that point, the DR position and the location of the two beacons can be used in an analogous manner to unambiguously determine the initial offset angle, as illustrated in FIG. 5, by obtaining the actual path azimuth 61 between the beacons 62 and 64 and utilizing the difference between the apparent path azimuth 66 of the apparent vehicle track 68 and the actual path azimuth 61 of the path to obtain the initial offset angle. As shown in FIG. 6, this embodiment of the method for determining vehicle azimuth generally involves determining vehicle proximity to a first position and a subsequent position (step 70); calculating an apparent path azimuth from said first position and said subsequent position (step 72); determining the actual path azimuth from said first position and said subsequent position (step 74); and correcting the assumed initial vehicle azimuth with the initial offset angle between the apparent path azimuth and the actual path azimuth (step 76). Generally the actual path azimuth 61 between two beacons with intervening turns does not coincide with the direction of any of the individual segments of the route, and the uncertainty in vehicle position is governed by both the street width W and the uncertainty in vehicle position along the route, delta L. Delta L is the error in locating the vehicle position along the route with respect to the coordinates of the beacon. The maximum uncertainty occurs when the azimuth lies along the hypotenuse of the triangle formed by the street width W, and delta L, and its value is given by:

$$\text{errorbound} = \arctan\{\text{sqrt}(W^2 + (\text{delta } L)^2)/2D\}.$$

Since this error can occur at both ends of the route segment, the maximum uncertainty can be twice this value. This analysis is worst case; one can refine the actual error estimate on the basis of a preliminary calculation of the angle between the bearing between the signposts and the local route azimuth is known in the vicinity of each beacon.

Thus, the present invention establishes the initial offset angle by calculating an apparent path azimuth for the apparent vehicle track on the travel path with an assumed initial azimuth and calculating the initial offset angle as the difference between the apparent path azimuth and the actual path azimuth of the path. The assumed initial vehicle azimuth is then corrected by the initial offset angle, bringing the apparent and actual path azimuth angles into coincidence. The present invention has been specifically described as determining the actual path azimuth of the travel path from a first beacon or position. This actual path azimuth information as well as other path information such as distance can be transmitted by the first beacon, or the vehicle position determination system can store or calculate such information. Additionally, in an alternative form of the present invention, the initial offset angle is calculated as the vehicle passes the second position or beacon, and the actual path azimuth is the azimuth between the beacons. Moreover, the actual path azimuth of the path has been described as being associated with the azimuth between adjacent beacons or positions or the azimuth associated with a restricted travel path or path segment in the vicinity of the first beacon.

Modifications to the preferred embodiments of the present invention can occur depending on whether the actual path azimuth is associated with adjacent beacons or with a restricted travel path without departing from the spirit and scope of the present invention. Furthermore, the present invention can calculate the initial offset angle and thus the vehicle azimuth by combinations of the abovementioned techniques. For example, the present invention can determine the actual path azimuth of a restricted travel path associated with a first beacon, but upon reaching the second beacon, the actual path azimuth can be calculated as between the adjacent beacons and used to obtain a more accurate vehicle azimuth.

We claim:

1. An apparatus for establishing a vehicle azimuth of a vehicle for a vehicle location determination system using a gyroscope and a distance sensor, said apparatus comprising:
    a receiver for receiving information signals at least representing proximity to a first position; and
    a computer coupled to said gyroscope, said receiver and said distance sensor, said computer is constructed and arranged to determine proximity to a first position and a subsequent position, said processing circuitry determines an actual path azimuth between said first position and said subsequent position and calculates an apparent path azimuth for an arbitrary path traversed by said vehicle between said first position and said subsequent position, said computer is further constructed and arranged to determine said actual path azimuth upon determining proximity to said subsequent position and to obtain an offset angle as the difference between said apparent path azimuth and said actual path azimuth, said offset angle corrects said vehicle azimuth.

2. The apparatus of claim 1 wherein said first position is determined by information signals from a beacon.

3. The apparatus of claim 1 wherein said first position and said subsequent position are determined by GPS signals.

4. A method of establishing a vehicle azimuth of a vehicle for a vehicle location determination system using a computer coupled to a gyroscope and a distance sensor, said method comprising the steps of:
    determining vehicle proximity to a first position and a subsequent position, said first and said subsequent positions having an actual path azimuth between said first position and said subsequent position;
    calculating an apparent path azimuth for an arbitrary path traversed by said vehicle from said first position and said subsequent position;
    determining said actual path azimuth between said first position and said subsequent position; and
    correcting said vehicle azimuth with an offset angle obtained as the difference between said apparent path azimuth and said actual path azimuth.

5. The method of claim 4 wherein said first position is determined by information signals from a beacon.

6. The method of claim 4 wherein said first position and said subsequent position are determined by GPS signals.

7. The apparatus of claim 1 wherein said apparent path azimuth is calculated by determining the azimuth between said first position and said subsequent position which is calculated by dead reckoning.

8. The apparatus of claim 1 wherein said computer determines proximity to said subsequent position by analyzing information signals received by said receiver.

9. The apparatus of claim 8 wherein said computer determines proximity to said subsequent position using information signals received by said receiver at said first position.

10. The method of claim 4 wherein said step of calculating said apparent path azimuth includes the step of determining the azimuth between said first position and said subsequent position which is calculated by dead reckoning.

11. The method of claim 4 wherein said step of determining vehicle proximity to said subsequent position includes the step of analyzing information signals received by a receiver coupled to said computer.

12. The apparatus of claim 11 wherein said step of determining vehicle proximity to said subsequent position includes the step of using information signals received by said receiver at said first position.

* * * * *